July 25, 1961 L. R. F. HARRIS ET AL 2,994,064

INFORMATION TRANSMITTING CIRCUITS

Filed April 11, 1955 5 Sheets-Sheet 1

INVENTORS
Lionel R. F. Harris &
Sidney W. Broadhurst
BY Hall & Houghton
ATTORNEY INVENTORS
Lionel R. F. Harris, &
Sidney W. Broadhurst,
BY Hall & Houghton
ATTORNEY July 25, 1961 L. R. F. HARRIS ET AL 2,994,064

INFORMATION TRANSMITTING CIRCUITS

Filed April 11, 1955 5 Sheets-Sheet 3

INVENTORS
Lionel R.F. Harris &
Sidney W. Broadhurst,
BY Hall & Houghton
ATTORNEY

INFORMATION TRANSMITTING CIRCUITS

Filed April 11, 1955 5 Sheets-Sheet 4

INVENTORS
Lionel R. F. Harris &
Sidney W. Broadhurst,
BY Hall + Houghton
ATTORNEY July 25, 1961 L. R. F. HARRIS ET AL 2,994,064

INFORMATION TRANSMITTING CIRCUITS

Filed April 11, 1955 5 Sheets-Sheet 5

INVENTOR
LIONEL R. F. HARRIS &
SIDNEY W. BROADHURST

BY *Hall & Houghton*
ATTORNEY

United States Patent Office 2,994,064

Patented July 25, 1961

2,994,064

INFORMATION TRANSMITTING CIRCUITS

Lionel Roy Frank Harris, Kenton, and Sidney Walter Broadhurst, Kingsbury, England, assignors to Her Majesty's Postmaster General, London, England Filed Apr. 11, 1955, Ser. No. 500,557

Claims priority, application Great Britain Apr. 15, 1954

9 Claims. (Cl. 340—172.5)

Figure 1:
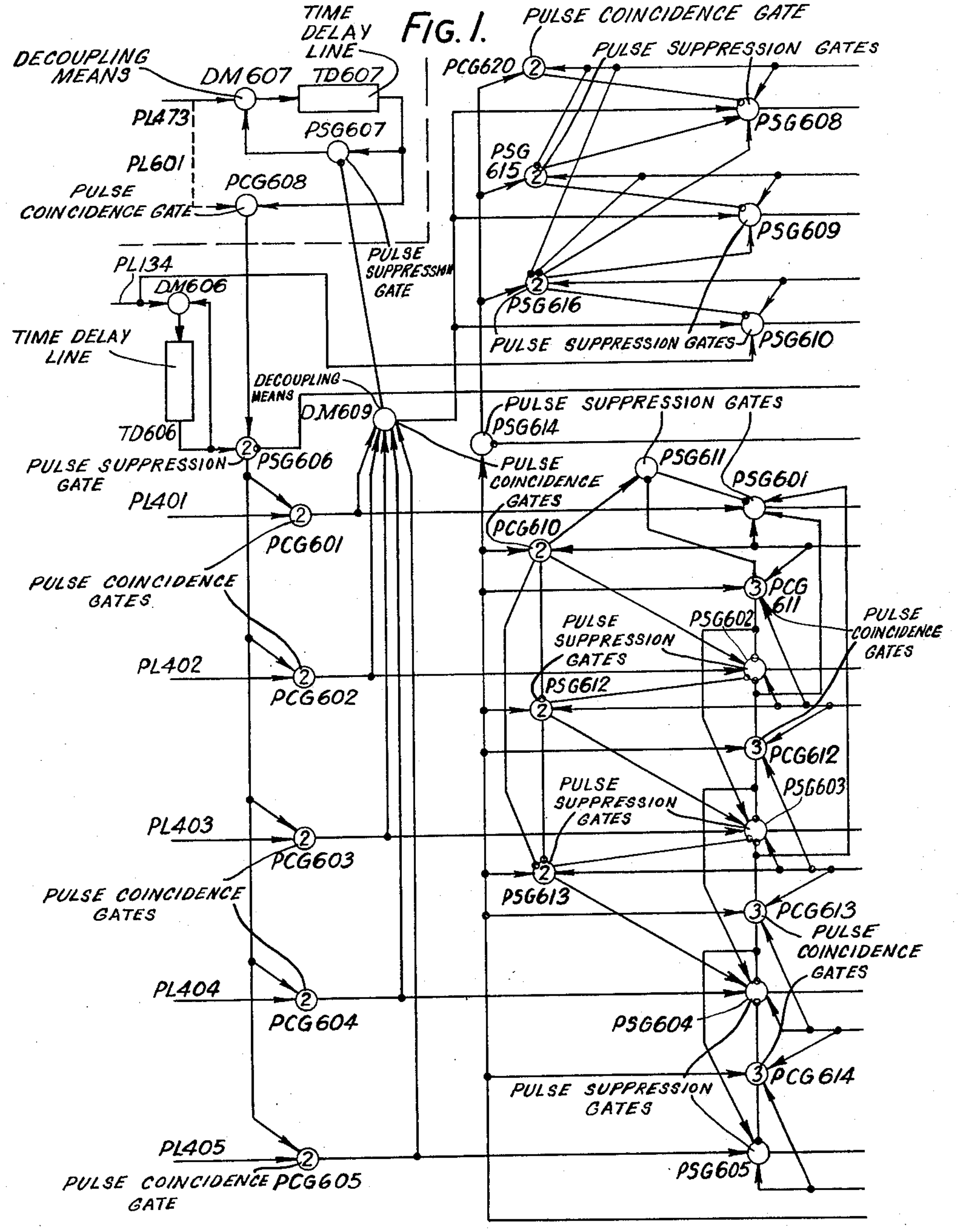

This invention relates to information transmitting circuits in which information received by the circuit is transmitted as interruptions of the operating condition of an outgoing circuit. The invention has particular although not exclusive reference to automatic telephone systems in which information designating a wanted subscriber, service, etc is transmitted as dial pulses.

PROLOGUE

A characteristic of many communication systems is that the designation information identifying a wanted subscriber or service is transmitted from the originating end, signal converter or regenerator, switching stage, or storage device in the form of "on-off" signals, irrespective of the way in which the information is received in the first instance. These transmitted signals may consist of a series of interruptions of a normal circuit operating condition, which has been imposed on the outgoing line already selected, e.g. pulses corresponding to those generated by a dial in a telephone system or those passed over a telegraph link, and corresponding in number to a particular digit of a number indicative of the wanted subscriber or service.

In telephone systems successive trains of pulses sent in this manner must be separated from each other so that any unit receiving them will be able to determine the beginning and end of each train as well as the number of pulses therein. In many cases, notably on outgoing junctions to other telephone exchanges, these pulses directly control the positioning of the selecting means over which the call is to be established, and the sending of signals must then be at a standard speed and "on-off" ratio (corresponding to "make-break" in a dial system) as determined by the selecting means responding to the signals.

With electromechanical regenerators and senders the timing of dial signals involves careful relay adjustment in order to operate within narrow margins of speed and ratio, and any added complication such as the transformation of the signals to dial pulses when the information is received in some other form reduces the tolerances still further.

This invention finds particular application to the transmission of dial pulses in automatic telephone exchange systems in which it is necessary to provide apparatus to receive designation information from a plurality of lines and to retransmit the information in the same or in a different form to operate switches in the same or in a remote exchange to further the progress of calls.

In an information transmitting circuit according to the present invention, information to be transmitted as interruptions in the operating condition of an outgoing circuit is received by and temporarily stored by the transmitting circuit on a time division basis. The transmitting circuit may include means for inserting a required time interval between successive trains of interruptions.

The reception of information on a time division basis enables the circuit to be common to a number of information sources. The use of a common transmitting circuit thus obviates the necessity of individual adjustment of the circuit for each outgoing circuit since the timing functions necessary for the generation of dial pulses suitable for the operation of switching stages may be formed by the common circuit.

The information may be received by the transmitting circuit over a wire or wires particular to each source of information which is temporarily or permanently associated with an outgoing circuit. Although the information is received by the transmitting circuit on a time division basis it need not be transmitted from the information sources in that form in which case further means are provided for converting the information transmitted from the information sources into a form suitable for reception by the transmitting circuit on a time division basis.

Similarly each outgoing circuit may be connected to the transmitting circuit by a wire over which the information is transmitted or alternatively, the information may be transmitted from the transmitting circuit over a common outgoing circuit in which case a time division basis is again used and the information relating to one source is allotted a particular instant in a recurring time cycle.

DRAWINGS

Figures 2, 5:
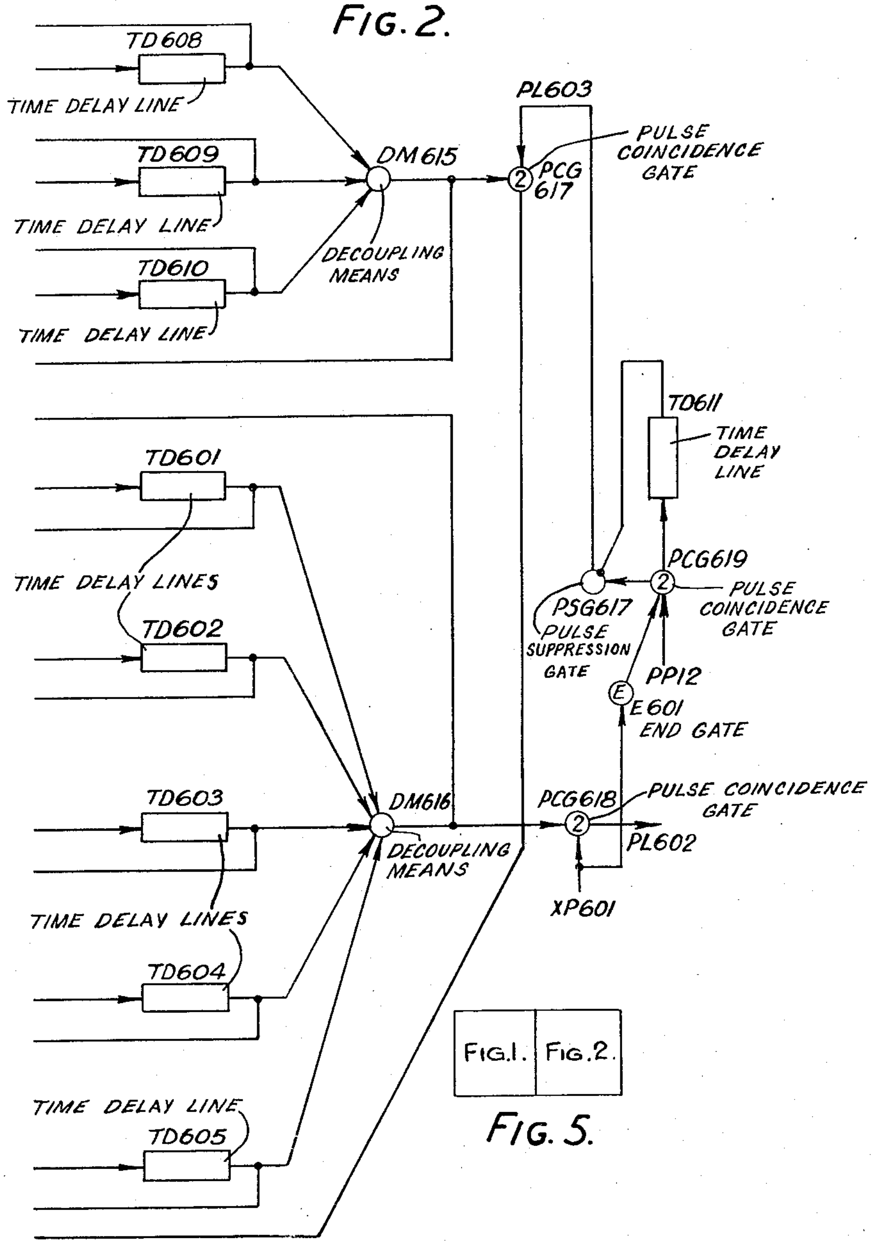
Figure 3:
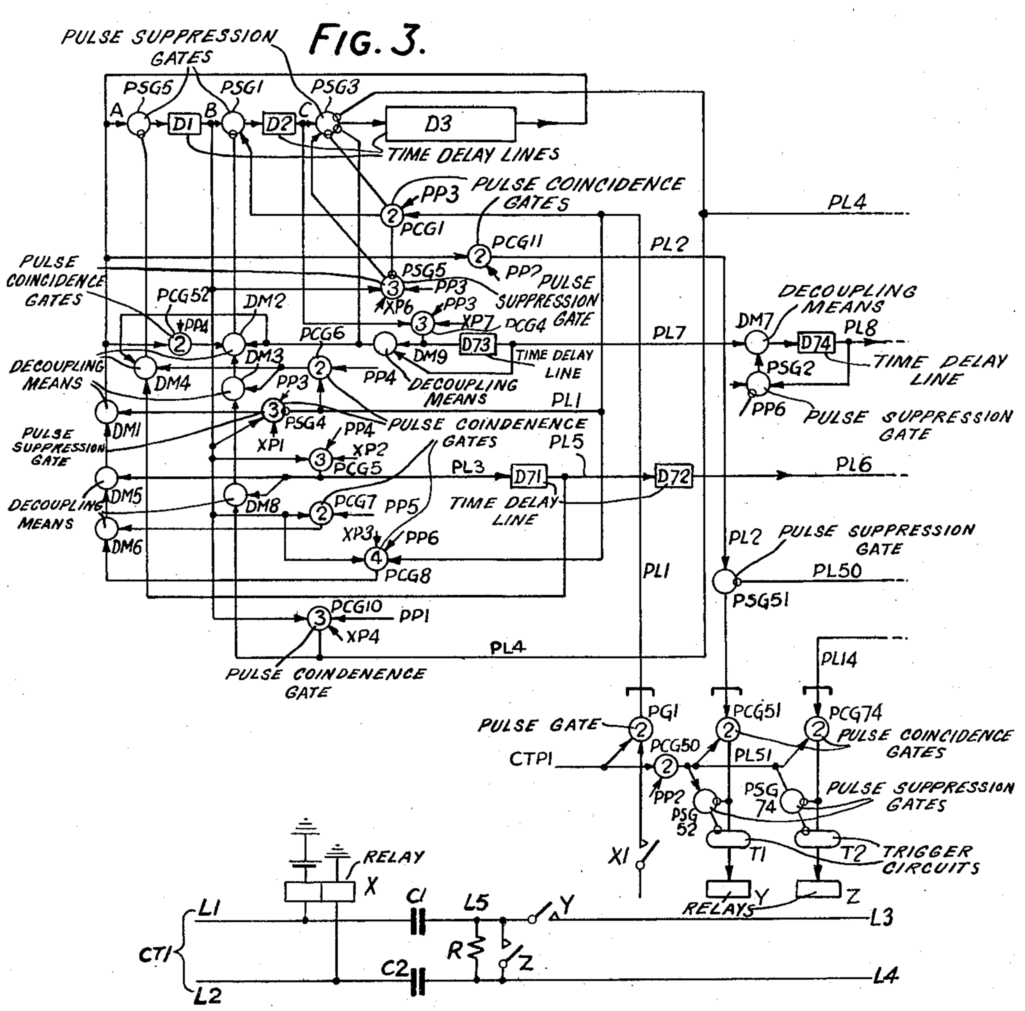
Figure 7:
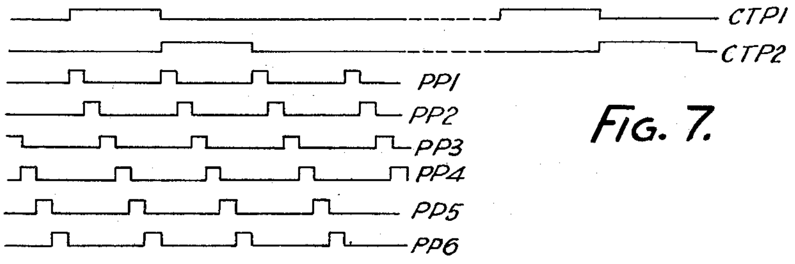
Figures 4, 6:
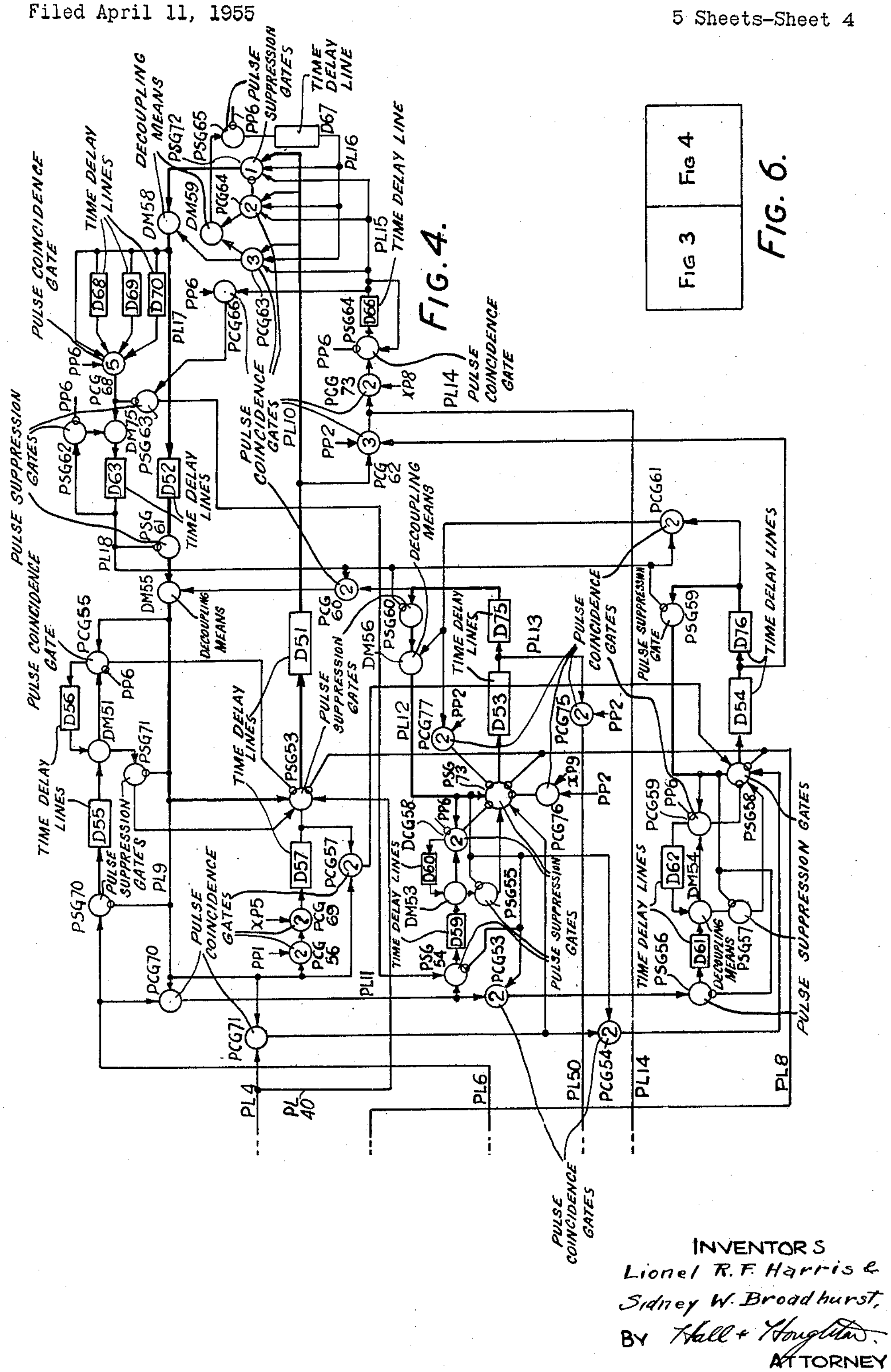

As examples of the invention two circuits operating in accordance therewith and suitable for use in a register controlled automatic telephone exchange will now be described with greater detail with reference to the accompanying drawings of which FIGS. 1 and 2 assembled as shown in FIG. 5 show in block schematic form a first circuit, FIGS. 3 and 4 when assembled as shown in FIG. 6 show in block schematic form a second circuit, FIG. 7 shows the waveforms of pulse trains used in FIGS. 3 and 4, FIGS. 8 and 9 are simplified block schematics of the first and part of the second circuits respectively.

In these figures, and in the following description thereof, known elements are employed in novel combinations and sub-combinations, and for brevity, such elements are designated by code prefixes to the reference numerals as follows:

| Known element: | Code prefix |
|---|---|
| Pulse lead | PL |
| Position pulse train | PP |
| Break pulse | XP |
| Pulse coincidence gate | PCG |
| End gate | E |
| Pulse suppression gate | PSG |
| Time delay line | TD |
| Stored pulse | SP |
| Decoupling means | DM |

Similarly, for simplicity, the symbols now standard in the pulse gating art are used in the drawings for the several types of pulse gates, viz:

| Type of Gate | Code | Basic Symbols | Operation |
|---|---|---|---|
| Pulse coincidence gate. | PCG | a circle inscribed with a numeral. | Coincidence of pulses on the inscribed number of input lines (arrowed) produces output pulses on all outgoing lines (not arrowed). |
| Pulse Suppression Gate. | PSG | a circle with arrowed inputs, circled suppression leads and non-arrowed outputs. | pulses received over any line (arrowed), in absence of inhibiting pulse on any suppressing line (small circle) produces output pulse on all outgoing lines (not arrowed). |
| End Gate | E | a circled-E with arrowed input and non-arrowed output. | the cessation of a pulse on input line (arrowed) produces pulse on output line (not arrowed). |

The coincidence and suppression gates may be of any suitable type, for example, of the electron tube types exemplified in Flowers Patent No. 2,666,809, issued Jan. 19, 1954, or of the Multi-Rectifier Types, exemplified in Flood et al. application Ser. No. 276,306, filed March 13, 1952, and issued as U.S. Patent No. 2,760,160 on Aug. 21, 1956, and hence do not require specific illustration herein. In connection with such gates it will be appreciated that when electron tube type gates are employed, the signal and signal suppression inputs may effect the biases of the cathode, the control grid, and other grids in the tube to control the conductivity of the tube, and that the outputs may be taken from anode loads or from cathode loads of the cathode follower type, as may be appropriate to the functions to be performed. Further, that when multi-rectifier types of gates are employed, the signal and suppression inputs may effect the conductivity of one way current devices to prevent or provide by-pass of charging potentials thus controlling the output potential or potentials of the gates, which may be reflected on one or more output leads or parallel branches thereof as illustrated herein.

Similarly, the delay lines "TD" may be of any suitable type, for example of the mercury filled supersonic type disclosed in Flowers U.S. Patent No. 2,666,809, issued Jan. 19, 1954, or of the resistance-capacity type disclosed in Harper U.S. Patent No. 2,695,383, issued Nov. 23, 1954.

*Example 1*

The first circuit to be described is suitable for a telephone exchange operating on a time division multiplex basis and incorporating control apparatus as described in the specification of co-pending U.S. application Ser. No. 471,073 of L. R. F. Harris (issued as U.S. Patent No. 2,876,284 on Nov. 3, 1959).

In the circuit shown in FIGS. 1 and 2, the information to be re-transmitted by the dial pulse regenerator is received over a common set of wires PL401, PL402, PL403, PL404 and PL405 on which information relating to each outgoing circuit may be received. The common input wires PL473 and PL134 convey signals which are are used to control the transmitting of the inforation as will be described later. The output consists of the common wire PL602, on which each individual output circuit is distinguished by the time position of its respective pulse train.

In general, the information may be presented to the regenerator in any form, but in this embodiment, it is assumed to be in a "two out of five" code form and similarly any other code employed, e.g. binary, in the regenerator has been selected only by way of example.

Each connection which is being dealt with by the control apparatus referred to above is allotted a time spaced pulse train which is one of a set of N time spaced trains, one for each connection. Each pulse train identifies a register, and it is convenient to refer to the pulse train as a register pulse train. The information relating to the connection is denoted by the presence or absence of the pulses.

A delay line of capacity N bits or of a delay equal to, or nearly equal to the pulse repetition time of a pulse train, and subsequently referred to as a "short" delay line, may be used to store one bit of information for each of N registers, and its output may be used either alone or in combination with the output from other delay lines to indicate a particular function that is required. Similarly, a delay line of capacity XN bits or of a delay equal to $x$ times the repetition time of an information source pulse train, and subsequently referred to as a "long" delay line, may be used to store $x$ independent bits of information for each of N registers. Thus if each of 99 information sources has a pulse train of 0.8 microsecond pulses and pulse repetition frequency 10 kc./s., a 1400 microsecond delay line may be used to store 14 bits of information for each register. Each of these 14 bits corresponds to a pulse train of repetition time 1400 microseconds, and all 14 such trains coincide with that of the associated register. Each of the 14 trains may be associated with some different digit of the number stored. The pulses associated with a particular digit, say, the third, fourth, etc., for all the connections may be arranged to constitute a time spaced pulse train (a position pulse train) for example of pulse repetition time 1400 microseconds and 100 microsecond duration or of a 1400/99 microseconds repetition time and duration 0.8 microsecond, or any other arrangement whereby each register pulse train coincides with each position pulse train once every 1400 microseconds. The position pulse train may be designated PP1, PP2 . . . PP14.

In the following description it is assumed that information is being taken from only one register, for this makes it easier to follow the description but the regenerator is not excluded from receiving and sending more than one set of signals. When, in fact, more than one register uses the regenerator the processes are interwoven in time and the transmission paths connected to the regenerator are used by a register at times individual to it. Hence to describe the operation for one register will be sufficient to explain the operation of the regenerator.

Two essential functions of the regenerator are the conversion of the received information into the appropriate number of dial pulses and the timing of the inter-train pause. Both operations are dependent on "end of dial break pulses," the derivation of which, and the performance of the two mentioned functions, as depicted in FIGURE 8, will be described first in order to simplify the subsequent description of the regenerator's operation as a whole.

Figure 8:
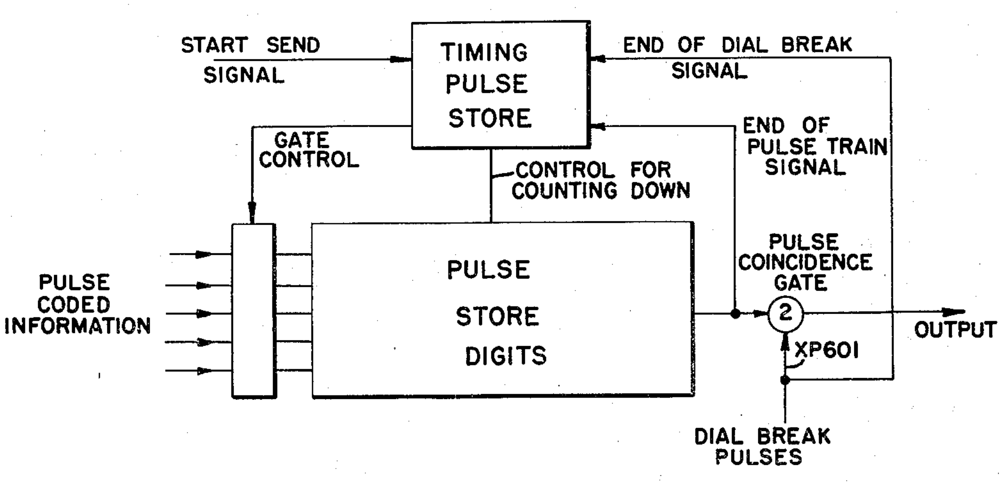

Pulse coded digits are transmitted over a combination of leads connected via input control gates to a digit pulse store comprising a number of delay lines not shown individually in FIGURE 8. Storage of the pulses is controlled by the input control gates which are opened by a control signal sent out from a timing pulse store over a gate control lead. The gate control signal results from the application to the timing pulse store of a "start-send" signal.

As will be described more fully below, the pulse coded digits are stored in a combination of delay lines in the digit store and are used to control, by means of pulse coincidence gate PCG618, the transmission of dial break pulses which are applied to the gate over lead XP601. The pulses in the digit store are translated into the appropriate number of dial pulses by a process of "counting down" or varying the storage distribution of pulses between the delay lines in the digit store. The counting down is effected under the control of signals derived from the dial break pulses on lead XP601 and applied via the timing pulse store to the main store.

The timing pulse store also effects the timing of inter-train pauses by means of an "end of pulse train" signal derived from the output of the digit store. After receipt of such a signal, there is a predetermined period through which the input control gates are held closed to prevent the storage of pulses representing a succeeding digit. The timing pulse store also inserts a predetermined delay between the receipt of a "start-send" signal and the transmission over the gate control lead of a signal to open the input control gates. That delay ensures that "pulse clipping" does not occur and enables a receiving circuit to become receptive before the transmission of dialled pulses commences.

A more detailed description will now be given with reference to FIGURES 1 and 2.

Dial break pulses from a common generator appear on lead XP601 and can be gated through PCG618 to modulate the condition of the outgoing circuit via PL602 when the transmitting of dial pulses is required. The dial break pulses are also applied to an "end" gate E601, the output of which is a pulse of duration at least equal to that of the complete cycle for a "long" delay line. This output is gated through PCG619 by position pulse train PP12, and thus the output of PCG619 inserts a pulse into the long delay line TD611 and opens PSG617. The output from TD611 inhibits PSG617, so that only one PP12 pulse corresponding to a particular dial break pulse can occur for each register pulse train cycle. The output from PSG617 is referred to as an "end of dial break" pulse. It is essential that the "end of dial break" pulse be locked to PP12 in some such manner, for if this were not the case, when the inhibition was removed from PSG606, the pulse passing through might not be the correct one in the sequence of indicating pulses, that have been stored in the long delay line TD607 from the line PL473. These pulses are referred to again later. This operation assumes that of the digits to be sent none are in positions PP13 or PP14. The application is in no way restricted to the particular means adopted to achieve this result.

The conversion of a "two out of five signal" to a train of pulses is carried out by inserting pulses representative of the digit to be transmitted, simultaneously into two out of the five "short" delay lines TD601, TD602, TD603, TD604, and TD605. Thereafter the distribution of these two pulses among the five delay lines is altered by means of their associated gates together with the "end of dial break" pulses which pass through PCG617. Of the pulse coincidence gates associated with the five delay lines it will be seen that only one of the "two" gates or one of the "three" gates is effective in altering at any one time the distribution of pulses circulating in the delay lines. The operation of one of the "three gates" over-rides the effect that the simultaneous operation of one of the "two" gates might try to produce. Digit 0 (i.e. 10) is represented by pulses in TD601 and TD602. When the first "end of dial break" pulse is received PCG611 is opened. Besides over-riding the effect of PCG610, which has also operated, it deletes the pulse in TD602 by inhibiting PSG602 and inserts a pulse into TD603 via PSG603. The second "end of dial break" pulse operates PCG610, which deletes the pulse from TD601 via PSG611 and PSG601, and inserts a pulse into TD602. The third pulse operates on PCG612 which deletes the pulses in TD602 and TD603, and inserts pulses into TD601 and TD604. Pulses four and five operate on PCG610 and PSG612 respectively, and while a pulse is maintained in TD604 the one from TD601 is moved to TD602 and then to TD603. The sixth pulse operates PCG613, which deletes the pulses in TD603 and TD604 and inserts pulses into TD601 and TD605. The seventh, eight and ninth pulses operate PCG610, PSG612 and PSG613 respectively, and while a pulse is maintained in TD605 the one from TD601 is moved to TD602, then to TD603, nad then to TD604. The tenth pulse operates PCG614, which deletes the pulses in TD604 and TD605. The five delay lines are now empty. Thus, the conditions accompanying the counting down from the 0 (i.e. 10) digit condition to the end of the dial pulse train, tabulated with X designating the pulse storing circuits containing pulses, and 0 designating those not containing pulses at each step, in the form shown accord with Table 1, following.

TABLE 1

| Digit | TD601 | TD602 | TD603 | TD604 | TD605 |
|---|---|---|---|---|---|
| 10 | X | X | 0 | 0 | 0 |
| 9 | X | 0 | X | 0 | 0 |
| 8 | 0 | X | X | 0 | 0 |
| 7 | X | 0 | 0 | X | 0 |
| 6 | 0 | X | 0 | X | 0 |
| 5 | 0 | 0 | X | X | 0 |
| 4 | X | 0 | 0 | 0 | X |
| 3 | 0 | X | 0 | 0 | X |
| 2 | 0 | 0 | X | 0 | X |
| 1 | 0 | 0 | 0 | X | X |
| Off | 0 | 0 | 0 | 0 | 0 |

Just as a zero (i.e. 10), represented by pulses on lines PL401 and PL402, injects pulses into TD601 and TD602; so any other digit injects pulses into those two of the TD601–605 devices designated adjacent thereto by X in Table 1, and the end of dial break pulses then count down, as per Table 1, from the said position to the off position, at which the five delay lines are empty. With pulses present in any of TD601, TD602, TD603, TD604 and TD605, PCG618 is marked through DM616 and dial break pulses present on lead XP601 are passed via PL602 to the outgoing circuit. When the five delay lines TD601–TD605 are empty of pulses (off position—Table 1) then PCG618 is not marked through DM616, and the dial break pulses XP601 are not passed to the outgoing circuit. Since the dial break pulses XP601 and the end of dial break pulses that effect the stepping down (Table 1) are synchronized, a dial break pulse is thus delivered to the output PL602 for each step of the stepping down operation, thus producing on the output PL602 a number of dial break pulses corresponding to the digit supplied to the converter from leads PL401–PL405 on a two-of-five basis.

The timing of the inter-train pause is allowed for by injecting pulses into the three "short delay lines TD608, TD609 and TD610. With PSG614 not inhibited, the distribution of pulses among these delay lines is altered by means of the "end of dial break" pulses which pass through PSG614, together with the associated gates. The pulse distribution is in binary form, and so a maximum "counting down" of seven dial pulse periods is obtainable. With pulses in all three delay lines, PSG615 and PSG616 are inhibited, and the only gate responsive to the first "end of dial break" pulse is PCG620. The output from this gate inhibits PSG608, and removes the pulse circulating through TD608. When the second "end of dial break" pulse is received only PSG615 is responsive, and this gate inhibits PSG609, thereby removing the pulse circulating through TD609, and injects a pulse into TD608 via PSG608. The third operative pulse removes the pulse from TD608 via PCG620 and PSG608, the fourth removes the pulse from TD610 via PSG616 and PSG610 and injects a pulse into both TD608 and TD609 via PSG608 and PSG609 respectively. The fifth, sixth and seventh pulses eliminate the pulses from both TD608 and TD609 as described for the first, second and third pulses. Thus the conditions accompanying the several operations of the inter-train pause timer, tabulated with X designating the pulse storing circuits of FIGS. 1 and 2 containing pulses, and with 0 representing those not containing pulses at each step, in the form shown accord with "Table 2," following:

TABLE 2.—INTER-TRAIN PAUSE TIMER

| Condition | TD608 | TD609 | TD610 |
|---|---|---|---|
| (A) Initial | 0 | 0 | 0 |
| (B) When engaged by PL134 for suppressing PSG606 during operation of Converter (Table 1) | 0 | 0 | X |
| (C) When activated through DM609 | X | X | X |
| (D) When removal of suppression from gate PSG614 by attaining of "off" position (Table 1) admits end of break pulses to PCG620, PSG615 and PSG616: | | | |
| Pulse No.— | | | |
| 1 | 0 | X | X |
| 2 | X | 0 | X |
| 3 | 0 | 0 | X |
| 4 | X | X | 0 |
| 5 | 0 | X | 0 |
| 6 | X | 0 | 0 |
| 7 | 0 | 0 | 0 |

When the seventh end of break pulse has deleted all stored pulses therefrom, the cycle of the inter-train pulse timer is complete and PSG615 is no longer marked. Thus using the three delay lines as described, time intervals up to a maximum duration of 700 milliseconds can be counted in steps of 100 milliseconds.

The operation of the regenerator as a whole can now be described. Pulses indicating the digits to be read out from a main store of the control apparatus referred to above are received on PL473, and these circulate through PCG607, TD607 and PSG607. A "start-send" signal is received on PL134 when a connection is made to an outgoing circuit. This signal consists of the pulse train of the information source and is of a few milli-seconds duration. It is stored in the "start-send" "short" delay line TD606, and is injected via PSG610 into TD610, and the output from TD610 via DM615 inhibits PSG606 so maintaining the input gates PCG601, PCG602, PCG603, PCG604, and PCG605 closed. The object of the latter process is to make an interval of 400 milliseconds as already described between the receipt of the "start-send" signal and the commencement of transmitting so that any mechanical equipment encountered on the outgoing circuit will have time to become receptive before any dial pulses are transmitted. Incidentally, the method employed also ensures that the first dial pulse is not clipped due to transmitting commencing after a dial break pulse on the lead XP601 has begun.

When the inhibition is removed from PSG606, the pulse associated with the first digit to be read out from the main store opens PCG608, PSG606, and marks PCG601, PCG602, PCG603, PCG604, and PCG605. The pulses appearing on two out of the five leads PL401, PL402, PL403, PL404 and PL405 pass into the appropriate delay lines, and at the same time via DM609. This operation inhibits PSG607, so deleting the first digit indicating pulse from TD607, and injects pulses into the three delay lines TD608, TD609 and TD610, and the output from these latter inhibits PSG606, thus preventing any further digit being read out while transmitting is in progress and for 700 milliseconds thereafter, and marks PCG617, so permitting "end of dial break" pulses to become operative.

With pulses present in any of TD601, TD602, TD603, TD604, and TD605, DM616 provides an output and PSG614 is inhibited. PCG618 is also marked, and dial break pulses present on XP601 are passed via PL602 to the output circuit. When the five mentioned delay lines are empty PSG614 is no longer inhibited, and the "end of dial break" pulses begin to "count-down" the inter-train pause. At the end of this pause period the output from DM615 is no longer marked and the inhibition is removed from PSG606. The pulse in TD607 indicating the second digit to be read out can now mark the appropriate input gates, and the process already described is repeated.

At the end of transmitting all the required information a pulse will be still circulating in TD606. A method for deleting such pulse is described in the aforementioned application Ser. No. 471,073.

*Example 2*

A second transmitting circuit will now be described with reference to FIGS. 3, 4, 7 and 9. The circuit comprises a dial pulse regenerator and incorporates a dial pulse receiver using timing devices in which the several bits of information necessary to the circuit operation individual to each line occupy consecutive time positions.

In the dial pulse regenerator distorted dial pulses transmitted over a plurality of circuits are regenerated in undistorted form by common apparatus using time division multiplex techniques. FIG. 3 and FIG. 4 show the second circuit and they are assembled as shown in FIG. 5 to form a schematic of the regenerator.

In this regenerator the several bits of information necessary to the operation individual to each circuit occupy consecutive positions in each of a number of timing devices. A number of such groups of consecutive pulse positions may be stored in a single timing device. In this regenerator six pulse trains perform the function for each circuit and thus the total access time or length of each timing device must be a multiple of six units, where each unit corresponds to a pulse position. For example if 1200 microsecond magnetostriction delay lines are used for the timing devices with 2 microsecond duration pulses the regenerator could be made common to 100 circuits each making use of a period of $2\times6$ microseconds every $2\times6\times100$ microseconds. These periods of time allotted to each circuit coincide with pulse trains which will be referred to as circuit pulse trains and designated CTP1, CTP2, etc. The six pulse trains which in sequence each coincide with each circuit pulse train once in every cycle will be referred to as position pulse trains and designated PP1, PP2 . . . PP6 and pulses of these trains occur cyclically in that order. A timing diagram of these pulse trains is shown in FIG. 7.

One circuit CT1 is shown in FIG. 3 and the description will relate to this circuit it being understood that the operation for the other circuits is similar. It is assumed that each circuit is unidirectional and 2-wire and comprises two incoming leads such as L1 and L2 for CT1 over which designation information in the form of dial pulse trains is received, and two outgoing leads, such as L3 and L4 for CT1 over which regenerated dial pulse trains are transmitted. L1 is connected, via capacitor C1, lead L5 and relay contact Y in series, to L3 and L2 is connected via capacitor C2 to L4. L5 is connected to L4 via resistor R in parallel with relay contact Z. Current is applied to L1 from negative battery via one of a pair of balanced coils of relay X and earth is applied via the other coil of the relay X to L2. Capacitors C1 and C2 and the balanced coils of relay X form a high-pass filter allowing the transmission of voice frequency signals but preventing the transmission of dial pulses from the incoming side L1 and L2 to the outgoing side L3 and L4.

It is assumed that L3 and L4 are connected to a device at the distant end which may be seized and held by the calling loop condition provided by L3, contact Y closed, R and L4 and which responds to the "make" pulse loop condition provided by L3, contact Y closed, contact Z closed and L4, and the "break" pulse condition provided by L3, contact Y closed, contact Z open and L4. Contact Z is provided to give the maximum current for pulsing since the value of resistor R must be sufficiently high to prevent undue attenuation of speech frequencies.

Relay X is operated by a loop extended over leads L1 and L2 of circuit CT1. Relay contact X1 causes a D.C. condition to be applied to the pulse gate PG1 to which pulse train CTP1 is applied so that on the common output lead PL1 of PG1 and all similar pulse gates provided for other circuits, the pulse train CTP1 appears so long as relay X is operated. Thus when CT1 is seized pulse train CTP1 appears on PL1 and it will be interrupted by dial break pulses transmitted over CT1. Only when CT1 is released does the pulse train disappear from PL1 for a period longer than a dial break pulse.

I. DIAL PULSE RECEIVER—FIG 3

The regenerator as shown includes a timing device 1200 microseconds long, comprising three delay lines the first of which D3 is 1196 microseconds long and whose output A is connected via pulse suppression gate PSG5 to the second delay line D1 of 2 microsecond delay whose output B is connected via pulse suppression gate PSG1 to the third delay line D2 of 2 microsecond delay whose output C is connected via pulse suppression gate PSG3 back to the input of the first device D3. This timing device is used for the reception and detection of dial pulses from circuits such as CT1. Each pulse stored in the timing device causes trains of pulses to be generated at A, B and C, each train being displaced by one time unit (i.e. 2 microseconds). Each stored pulse will be known by the time at which it appears at A. Thus a stored pulse SP1 appears at A at time PP1, at B at time PP2 and at C at time PP3; stored pulse SP2 appears at A at PP2, at B at PP3 and at C at PP4 and so on.

(*a*) *Deriving first stored pulse SP2 for applying forward hold at time PP2 next following injection time PP3.*—Lead PL1 is connected to pulse coincidence gate PCG1 to which PP3 is applied so that when CT1 is seized, a pulse coincident with CTP1 and PP3 appears on the output of PCG1 which is connected as an inhibiting lead to pulse suppression gate PSG3 and also as an operate lead to pulse suppression gate PSG1 to which B is connected. As the output of PCG1 is connected as an operating lead to PSG1 the calling signal is stored as SP2 in the timing device coincident with PP2 in the timing device, at A. A is connected to pulse coincidence gate PCG11 to which PP2 is applied so that SP2 is transmitted to the output PL2. PL2 is connected via pulse suppression gate PSG51 to pulse coincidence gates associated with each circuit such as PCG51 provided for CT1. A pulse train coincident with CTP1 and PP2 is applied to PCG51 on lead PL51 so that while SP2 is stored and indicated on PL2 and is not inhibited in PSG51 by the appearance of a coincident pulse train on PL50, a pulse train appears on the output of PCG51. That train is applied so as to inhibit PSG52 and thus to operate trigger T1. Unless PSG52 is suppressed, T1 is held restored by the pulses on PL51, the output of pulse coincidence gate PCG50 to which CTP1 and PP2 are applied. T1 operates relay Y which remains operated for as long as T1 is operated. Relay Y operated extends the forward calling loop condition to the distant end via L3, contact Y operated, R and L4 and thus seizes and holds the connection forward.

(*b*) *Deriving and applying dial break indication by second, third and fourth stored pulses SP3, SP4 and SP5, latter converted to SP1 (for CTP2), by delay of three time units.*—PL1 is also connected as a suppression lead to pulse suppression gate PSG4 to which B is connected together with PP3 and XP1. XP1 is a pulse train of 1200 microseconds pulse duration and of a repetition time just less than half the minimum probable duration of a distorted dial break pulse indicated on PL1. Thus with SP2 stored and a break appearing, a pulse coincident with PP3 and XP1 is transmitted through PSG4 and via decoupling means DM1 operates the timing device at A to cause SP3 to be stored and to appear at B at time PB4. B is connected to PCG5 to which XP2 and PP4 are also connected. Pulse train XP2 is a pulse train of 1200 microsecond pulse duration, the pulses of which immediately precede those of XP1. Thus if SP3 is stored for a period between an XP1 pulse and an XP2 pulse, an SP3 pulse at time PP4 is transmitted through PCG5 to PL3. When CTP1 appears on PL1 which is also connected to pulse coincidence gate PCG6 to which PP4 is connected, a PP4 pulse is applied via decoupling means DM4 to remove SP4, if present, from the timing device at PSG5 and via DM3 and DM2 to remove SP3 at PSG1. Thus CTP1 must be absent from PL1 for the whole of a period between XP1 and XP2 for a pulse to appear on PL3 and this is used to indicate the appearance of a dial break pulse. The pulse on PL3 is applied via decoupling means DM8, DM3 and DM2 to delete SP3 from the timing device at PSG1 and time PP4 and to cause the storage of SP4 at PSG5 via decoupling means DM1 and DM5. SP4 is only deleted upon the reappearance of CTP1 on PL1 as just described. The fact that SP4 is stored prevents SP3 being again stored via pulse coincidence gate PCG52 to which PP4 is applied and which is between A and PSG1 via DM2. This prevents the double indication of a dial break pulse even though the distorted dial break pulse may exceed twice the period between an XP1 pulse and the next XP2 pulse. PL3 is connected via a 4 microsecond delay line D71 to PL5 which is connected via a 2 microsecond delay line D72 to pulse lead PL6 on which one PP1 pulse (coincident with CTP2 not CTP1) appears for each dial break pulse.

B is connected to pulse coincidence gate PCG7 to which PP5 is connected so that the storage of SP4 causes SP5 to be stored via decoupling means DM6, DM5, DM1 and PSG5. The storage of SP5 indicates that a dial break pulse has been received. B is also connected to pulse coincidence gate PCG8 to which XP3, PP6 and PL1 are also connected. XP3 is a pulse train of 1200 microseconds pulse duration and pulse repetition time just less than half the minimum inter-train pause time but clearly greater than the minimum pause between breaks of the same pulse train. Thus if B carries SP5 indicating that a pulse break has been received and if no pulse break is present as indicated by CTP1 on PL1 a PP6 pulse is transmitted through PCG8 at XP3 and causes SP6 to be stored via DM6, DM5, DM1 and PSG5. B is also connected to pulse coincidence gate PCG10 to which XP4 and PP1 are connected. XP4 is a pulse train of 1200 microseconds pulse duration, the pulses of which immediately precede the XP3 pulses. If the SP6 pulse is stored for a complete period between an XP3 pulse and an XP4 pulse, a PP1 pulse (coincident with CTP2 and not CTP1) will be transmitted to the output lead PL4. SP6 is only stored for this period if no further dial break pulse is indicated on PL5 in this period. The appearance of a PP6 pulse on PL5 causes the deletion of SP6 at PSG5 via DM4. Thus the inter-train pause indication at PP1 on PL4 only appears after CTP1 has appeared continuously on PL1 for a period between the XP3 and XP4 pulses. PL14 is connected via DM8, DM3 and DM2 to PSG1 thus deleting SP6 and is also connected to PSG3 deleting SP5.

At the termination of a call the loop condition on L1 and L2 of CT1 is removed and CTP1 disappears from PL1. The forward loop condition on L3 and L4 is removed after an internal governed by the following timing operation. The removal of CTP1 from PL1 stops the transmission through PCG1 of PP3 pulses and therefore removes the inhibiting signal applied to PSG5 to which B, XP6 and PP3 are also connected. Thus if SP2 is stored and CTP1 disappears from PL1 a pulse is transmitted through PSG5 causing SP1 to be stored via PSG3. XP6 is a pulse train of 1200 microsecond pulse duration and of a repetition time greater than the duration of a dial pulse break or any likely spurious interruption of say 250 milliseconds.

C is connected to pulse coincidence gate PCG4 to which XP7 and PP3 are connected. XP7 is a pulse train of 1200 microsecond pulse duration and of which the pulses immediately precede the XP6 pulses. Thus if SP1 is stored for a whole interval between an XP6 and an XP7 pulse (i.e. 250 milliseconds) a pulse is transmitted through PCG4. This pulse applied directly to decoupling means DM9 deletes SP1 in PSG3 and via DM2 deletes SP2 in PSG1 and via DM4 deletes SP3 in PSG5. The deletion of SP2 removes the pulse from PL2 and thus removes the forward holding loop over L3 and L4. If after the storage of SP1, CTP1 pulse reappears on PL1 before the next XP7 pulse, SP1 is removed via PCG1 and PSG3. The output of PCG4 applied through 6 microsecond delay D73 to PL7 which is applied via DM9 and DM4 to PSG5 and via DM9 and DM3 to PSG1 and via DM9 to PSG3 thus deleting SP4, SP5 and SP6. PL7 is also connected via decoupling means DM7 to 2 microsecond delay D74 whose output is connected via pulse suppression gate PSG2 and DM7 back to its input. Thus a PP6 pulse on PL7 causes a succession of pulses to appear on PL8 the output of D74. PP6 is applied to PSG2 so that pulses coincident with CTP2 are generated on PL8 at times PP1, PP2 . . . PP6. Those are used to delete the stored pulses from the rest of the regenerator at the termination of a call as will be described later. Thus the dial pulse receiver shown in FIG. 3 gives a PP1 pulse on PL6 whenever a dial break pulse is received, a PP1 pulse on PL4 whenever an inter-train pause is detected and a succession of six pulses on PL8 at the termination of a call. The dial pulse counter and regenerator shown in FIG. 4 will now be described.

II. DIAL PULSE COUNTER AND REGENERATOR

First of all, however, reference will be made to FIGURE 9 which shows the regenerator in simplified form. The output from the dial pulse receiver of FIGURE 3 appears with the three leads shown on the left in FIGURE 9. The top lead carries pulses indicating dial pulse breaks, the next lead down carries pulses indicating inter-train pauses while the bottom leads indicates the end of a call.

The top and next pulse leads are connected to an input control circuit which controls the storage of pulses on the leads in timing devices of which three are shown. The first timing device is connected to an output lead via a counting circuit and the second timing device is joined to the first via a transfer control circuit and the third device is connected to the second in similar fashion.

Figure 9:
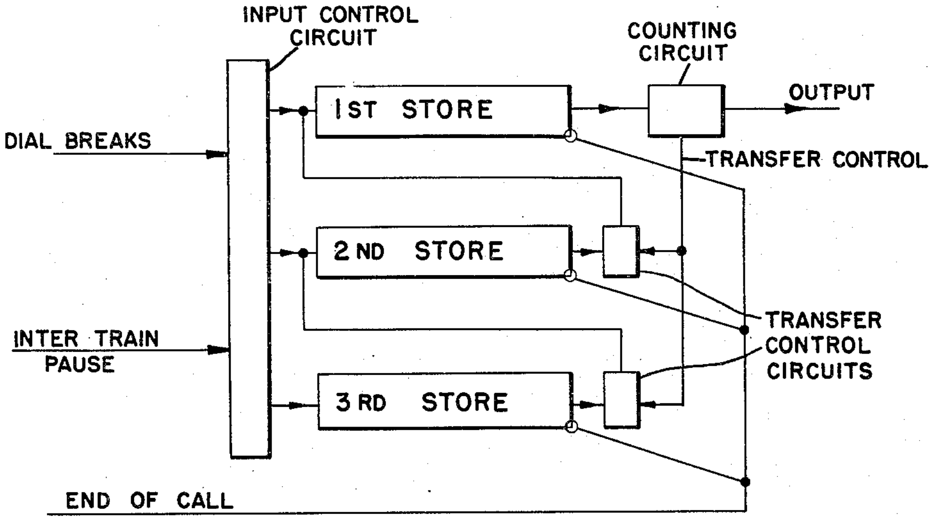

Briefly, the circuit of FIGURE 9 operates to store pulses representing a first train of dial break pulses in the first timing device, pulses representing a second train in the second timing device and those representing a third device in the third timing device. More than three timing devices may be provided. As soon as an indication of an inter-train pause is received, the pulses in the first device are counted by the counting circuit and an appropriate number of dial break pulses sent to line. When this has occurred the pulses in the first device are deleted and replaced by those in the second under the control of the transfer circuit. Similarly, the pulses in the third device are transferred to the second. The process is then repeated and the new pulses in the first device are counted and sent to line on receipt of an indication of a succeeding inter-train pause.

At the end of a call, all pulses in the store are deleted by means of the end of call signal.

FIG. 4 shows three timing devices each of 1200 microseconds total access time but each comprising two delay lines one of 12 microseconds and one of 1188 microseconds. The first timing device comprises 1188 microsecond delay line D51 and 12 microsecond delay line D52. This is used for counting the dial break pulses of each received train of pulses and for transmitting the regenerated dial pulse trains to line. The second and third timing devices consist of 1188 microsecond delay lines D53 and D54 together with 12 microsecond delay lines D75 and D76 respectively. These are used to count and store dial pulse trains received.

The general operation is as follows. The first dial pulse train is counted and stored in the first timing device, the second pulse train in the second, the third pulse train in the third and so on, but as soon as an inter-train pause indication is received the first train is sent to line. When this has occurred the information in the first timing device is deleted and replaced by that in the second, which in turn is replaced by that in the third and so on. Thus the member of timing devices provided is one plus the number of pulse trains that could be received while one pulse train is being sent. Three such additional timing devices would probably be necessary but only two are shown here for convenience, the operation of any additional ones being similar.

Information is inserted into the timing devices for circuit CT1 at times coincident with CTP2 pulses but after delays of 1188 microseconds, the information is available at the times of CTP1 pulses. The operation will now be particularly described with reference to FIG. 4.

(*a*) *Storage of 1st dial pulse train in first timing device* (*D51 circuit*).—The first dial break pulse is indicated as a single PP1 pulse (at CTP2) on PL6 which is connected to pulse suppression gate PSG70 and to pulse coincidence gate PCG70 to both of which PL9 the output of the first timing device is connected. Thus unless a coincident PP1 pulse is on PL9, the dial break pulse indication is transmitted through PSG70 and via 4 microsecond delay D55, decoupling means DM51, pulse suppression gate PSG71 to which PL19 is connected as an inhibiting stimulus and thence via pulse suppression gate PSG53, to the input of 1188 microsecond delay line D51. The first dial break pulse is thus stored at time PP3 in the first timing device. It goes in at time PP1 of CTP2 and on the output PL10 of D51 it appears at time CTP1. PL10 is connected via pulse suppression gate PSG72 and decoupling means DM58 and thence via 12 microsecond delay line D52, pulse suppression gate PSG61 and decoupling means DM55 back to PL9 connected via PSG53 to the input of D51. PP3 is thus stored until either an indication that another dial break pulse has been received or that an inter-train pause has been received. If a second dial break pulse is indicated on PL6 it will again pass through PSG70, D55 and DM51 but as PP3 appears at time PP1 (CTP2) upon PL9 it is inhibited in PSG71 but is transmitted through pulse coincidence gate PCG55 to which the output of DM51 and PL9 are connected. The PP3 pulse from PCG55 deletes PP3 from the first timing device by inhibiting it in PSG53 and causes PP4 to be stored since the output of PCG55 is delay in 2 microseconds delay D56, whose output is connected via DM51, PSG71 and PSG53 to the input of D51. Thus on the second break, PP3 is deleted and PP4 is inserted. Similarly on the third, PP3 is inserted and PP4 remains, on the fourth PP3 and PP4 are deleted and PP5 inserted and so on until after ten breaks PP4 and PP6 are stored in the form shown, as indicated in Table 3 following, in which X designates a stored pulse and 0 a time position in which no pulse is stored.

TABLE 3.—PULSES FROM PLG STORED IN FIRST TIMING DEVICE (D51 CIRCUIT)

| Break Pulse | Pulse Positions (PP) | | | |
|---|---|---|---|---|
| | 3 | 4 | 5 | 6 |
| 1 | X | 0 | 0 | 0 |
| 2 | 0 | X | 0 | 0 |
| 3 | X | X | 0 | 0 |
| 4 | 0 | 0 | X | 0 |
| 5 | X | 0 | X | 0 |
| 6 | 0 | X | X | 0 |
| 7 | X | X | X | 0 |
| 8 | 0 | 0 | 0 | X |
| 9 | X | 0 | 0 | X |
| 10 | 0 | X | 0 | X |

Thus the number of break pulses in the train is stored in the binary code using PP3, PP4, PP5 and PP6. If by some mischance a pulse train of 16 or more break pulses is received no pulse is inserted at PP1 (CTP3) since PP6 is applied to PCG55 inhibiting the transmission of PP6 through it, and thus preventing interference with the operation for a second circuit using CTP2.

(*b*) *Storage of 1st inter-train pause signal in 1st timing device, and storage of second dial pulse train in 2nd timing device* (*D53 circuit*), *etc.*—When a PP1 (CTP2) pulse appears upon PL4 indicating that an inter-train pause has been received, it is stored in the first timing device via PL40 and PSG53. Thus, a PP1 pulse of CTP2 after passing through D51 and D52 appears upon PL9 and prevents any further dial break pulse indications on PL6 from being transmitted through PSG70 but instead causes them to be transmitted through PCG70 to PL11. PL11 corresponds to PL6 but is provided as an input to the second timing device. The counting functions of PSG54, PCG53, 4 microsecond delay D59, DM53, PSG55, 2 microsecond delay D60, PCG58, PSG73, lead PL12 and 1188 microsecond delay D53, of the second timing device correspond exactly to those of PSG70, PCG70, 4 microsecond delay D55, DM51, PSG71, 2 microsecond delay D56, PCG55, PSG53, lead PL9 and 1188 microsecond delay D51 respectively, of the first timing device. The output PL13 of D53 is connected via 12 microsecond delay D75, pulse suppression gate PSG60 and decoupling means DM56 to PL12 thus completing the circulation path. The second train is counted into this timing device and stored and when a PP1 pulse is stored in it the dial break pulse indication at PL11 is suppressed in PSG54 and transmitted through PCG53 to the third timing device, 1188 microsecond delay D54 and 12 microsecond delay D76 where the counting of the next dial pulse train is effected in a precisely similar manner and so on for any additional timing devices provided. Meanwhile the first dial pulse train is being transmitted as follows.

(*c*) *Transmittal of 1st dial pulse train from 1st storage device.*—The storage of PP1 in the first timing device D51 and D52 is indicated on PL9 which is connected to PCG56 together with PP1. Thus when an inter-train pause has been received, PP1 appears on the output of PCG56 applied to pulse coincidence gate PCG69 to which XP5 is connected. XP5 is a pulse train of 1200 micoseconds pulse duration and repetition time equal to the inter-train pause required. The output of PCG69 is connected via 2 microsecond delay D57 to PSG53 causing the storage of PP2 in the first timing device. The output of D57 is also connected to pulse coincidence gate PCG57 together with PL9 so that after the second XP5/PP1 pulse from PCG69 a pulse is transmitted through PCG57 which is connected to the input of the third timing device D54 and D76 thus causing the storage of PP2 therein.

The outputs of D51 and D54 together with PP2 are connected to pulse coincidence gate PCG62, so that after an interval at least equal to the required inter-train pause after receiving the inter-train pause a PP2 pulse train coincident now with CTP1 for CT1 is transmitted through PCG62 to PL14. PL14 is connected to one pulse coincidence gate for each circuit as PCG74 for CT1 to which CTP1 at time PP2 is applied on PL51. The output of PCG74 is applied as an operating lead to trigger T2 and as a suppression lead to PSG74. Thus PL51 is prevented from inhibiting trigger T2 via PSG74 and trigger T2 is operated. T2 controls relay Z so that the appearance of coincident pulses applied at PP2 from D51 and D54 causes the operation of relay Z and the short circuit loop condition to be applied to the leads L3 and L4.

PL14 is also connected to pulse coincidence gate PCG73 to which XP8 is applied. XP8 is a pulse train of pulse duration 1200 microseconds and repetition frequency of 10 per second corresponding to the dial pulse rate required. Upon coincidence between XP8 and the output of PCG62 a pulse is transmitted via pulse suppression gate PSG64 to 2 microsecond delay line D66 whose output is connected to its input via PSG64 to which PP6 is applied as a suppression. On the output PL15 of D66 a sequence of pulses is generated at times PP3, PP4, PP5 and PP6 coincident with the pulses used to store in binary form in the first timing device the pulse train indicated on PL10.

PL10 and PL15 are connected to an adding circuit in which the binary number 1111 is added to the binary number stored in the first timing device D51 and D52 the most significant digit in the circuit being lost. Each such addition subtracts one from the stored binary number thus reducing by one the number of break pulses in the train remaining to be sent. Three leads PL10, PL15 and PL16 are all applied to each of three gates, pulse coincidence gates PCG63 and PCG64 and pulse suppression gate PSG72. A pulse on all three leads is transmitted through PCG63, on any two of them through PCG64, and provided a pulse is not transmitted through PCG64, a pulse on any one of them is transmitted through PSG72 to which the output of PCG64 is connected as a suppression. The outputs of PCG63 and PCG64 are connected together via decoupling means DM59 to pulse suppression gate PSG65 to which PP6 is applied, and thence via 2 microsecond delay line D67 to PL16 thus performing a "carry" function, except that no PP6 pulse may be "carried." The outputs of PSG72 and PCG63 are connected together via decoupling means DM58 to PL17 the input of D52. Thus when four consecutive pulses appear on PL15, if the least significant digit stored in the first timing device is indicated by a PP3 pulse, the pulse is transmitted through PCG64 and not through either of the other gates and therefore no pulse appears on PL17 at PP3, but one does appear on PL16 at PP4. If however the least significant digit is the absence of a PP3 pulse, an output is obtained from PSG72 only, causing a PP3 pulse to appear on PL17 and no "carry" pulse on PL16 at PP4. Similarly if the second digit is a 1 (presence of a pulse) PP4 is transmitted through PCG63 or PCG64 depending upon whether there is a "carry" pulse on PL16. If the second digit is an 0 (absence of a pulse) PP4 is transmitted through PCG64 or PSG72 depending upon the state of PL16, and so on, the "carry" pulse at PP6 being suppressed in PSG65. Thus, one is subtracted from the number stored at each XP8 pulse.

PL17 is also connected to 2, 4 and 6 microsecond delay lines D68, 69 and 70 whose outputs together with PL17 are connected to pulse coincidence gate PCG68 to which PP6 is also connected. PCG68 transmits a PP6 pulse if pulses appear coincidently on all five inputs thus indicating that digit 1111 has been stored i.e. that the number stored before the XP8 pulse was 0000. PL15 is connected to pulse coincidence gate PCG66 to which PP6 is applied so that when one is subtracted a PP6 pulse appears upon the output of PCG66. This is connected to pulse suppression gate PSG63 to which the output of PCG68 is applied as a suppression. The output of PSG63 is connected to the input of the second timing device D53 and D75 via PSG54, D59, DM53, PSG55 and PSG73 so that when one is subtracted PP2 (at CTP2) is stored in the second timing device unless suppressed by the change from 0000 to 1111 on PL17 as indicated on the output of PCG68. The dial pulse train has thus been sent and a shifting process takes place as will shortly be described.

(*d*) *Transmission of ensuing dial break pulse to line.*—The storage of PP2 in the second timing device D53 and D75 is used to send a dial break pulse to line. The output PL13 of D53 is connected to pulse coincidence gate PCG75 to which PP2 is applied so that while PP2 is stored in the second timing device PP2 at time CTP1 appears on PL50 the output of PCG75. PL50 inhibits the PP2 pulses on PL2 thus allowing trigger T1 and relay Y to reset and break at contact Y the forward signalling loop on L3 and L4. Contact Y remains open until PP2 is deleted from the second timing device. XP9 is a pulse train of 1200 microseconds pulse duration, the pulses of which occur a dial break pulse duration after those of XP8 (i.e. 66⅔ milliseconds later) and these pulses with PP2 are connected to pulse coincidence gate PCG76 whose output deletes in PSG73 the storage of PP2 from the second timing device D53 and D75.

(*e*) *Shifting 2nd and subsequent dial pulse trains to 1st timing device.*—Thus a train of dial pulses is transmitted to line until a pulse is generated at PP6 on the output of PCG68. This is applied via decoupling means DM75 to the input of 2 microsecond delay line D63 whose output is connected via pulse suppression gate PSG62, to which PP6 is applied, and DM75 to its input thus causing a sequence of six pulses to be generated on PL18 the output of D63 coincident with CTP2 and therefore with the circuit CT1 information on the outputs of D52, D75 etc. PL18 is connected as a suppression lead to PSG61 on the output of D52 thus deleting all the information relating to CT1 in the first storage device. It is also connected to pulse coincidence gates PCG60 and PCG61 on the outputs of D75 and D76 and similarly for any other timing devices. The output of PCG60 is connected via DM55 to PL9 of the first timing device thus causing the information held in the second timing device for CT1 to be transferred to the first timing device. This information is deleted from the second timing device by applying the six pulses on PL18 as inhibition stimuli to pulse suppression gate PSG60. Similarly the CT1 information in the third timing device (except for the PP2 pulse) is transferred to the second and so on. PL18 is connected to PSG61 together with the output of D76 and the output of PCG61 is connected via DM56 to PSG73 the input of the second timing device. However, PP2 is deleted from this information since PP2 is not associated with the pulse train stored in any particular timing device and is only used in sending out. The output of PCG61 is also connected to pulse coincidence gate PCG77 together with PP2, and the output is connected to PSG73 as a suppression.

After the shifting process the second digit is sent via L3 and L4 once the inter-train pause indication following the sending of the first digit has been received and after the inter-train pause has been timed. The digit to be sent is always in the first timing device and the next digit in the second timing device and so on, the shift process taking place after the sending of each pulse train.

(*f*) *Completion and termination of call.*—When there is no pulse on PL14 the trigger T2 is reset by PL51 via PSG74, resulting in Z relay releasing and the short circuit forward loop on L3 and L4 being removed leaving resister R and Y contact operated, across L3 and L4. At the termination of the call a succession of six pulses is generated on PL8 as already described and these are applied to suppression gates in each of the counting and sending timing devices thus deleting all the stored information. Thus PL8 is connected to PSG53, PSG73 and PSG58 of the three timing devices shown and at time coincident with PP1 . . . PP6 at CTP2 all the CT1 information is deleted.

EPILOGUE

It will be clear to those skilled in the art that other facilities which might be required of a regenerator may be performed using the techniques disclosed and that there are many variations of the sequential operation of it. Also many possible circuit techniques are adaptable to the functions required.

These embodiments serve as examples of how the invention may be carried into effect but it will be clear that there can be other ways of receiving dial pulses from a plurality of sources, which fall within the scope of the invention, and that there are other applications of the invention for example in the receipt of telegraph signals by a central regenerating station etc.

Although in the embodiments described above the pulse coded signals are transmitted over a single signalling path it will be understood that the invention is not limited to this feature and transmission could take place over several signalling paths. Such an arrangement may be especially suitable for telegraph systems embodying the invention.

We claim:

1. A transmitting circuit for the transmission of signals derived from information transmitted to the circuit from sources of information comprising in combination a pulse storage system, information receiving means connected to said system for receiving information from a source and storing the information in the system as a combination of pulses, a circuit connected to said system for varying the combination of stored pulses in stages whose number depends upon the information represented by the initially stored combination of pulses and for finally deleting the stored pulses from the system, and output producing means connected to the system for producing an output signal after the storage of the combination of pulses and at each stage of variation thereof.

2. A transmitting circuit for the transmission of signals derived from information transmitted to the circuit from sources of information comprising in combination, a pulse storage system comprising a plurality of pulse storage devices, information receiving means connected to said system for receiving information from a source and storing the information in the system as a combination of pulses stored in a combination of said storage devices characteristic of the information, a circuit connected to the system for varying the combination of stored pulses in stages whose number depends upon the information represented by the initially stored combination of pulses and for finally deleting the stored pulses from the system, and output producing means connected to the system for producing an output signal after the storage of the combination of pulses and at each stage of variation thereof.

3. A transmitting circuit for the transmission of signals derived from information transmitted to the circuit from sources of information comprising in combination, a pulse storage system comprising a plurality of pulse storage devices, information receiving means connected to said system for receiving information from a source and storing the information in the system as a combination of pulses stored in time positions selected from a recurring cycle of time positions in dependence upon the information, a circuit connected to the system for varying the combination of stored pulses in stages whose number depends upon the information represented by the initially stored combination of pulses and for finally deleting the stored pulses from the system, and output producing means connected to the system for producing an output signal after the storage of the combination of pulses and at each stage of variation thereof.

4. A transmitting circuit for the transmission of signals derived from information transmitted to the circuit from sources of information comprising in combination, a pulse storage system, information receiving means connected to said system for receiving information from a source, information storing means joined to said information receiving means and to said system for storing information in the system as a combination of pulses, control apparatus for said storing means comprising start signal producing means and time delay means for receiving the start signal and applying it after a time delay to said storing means to permit storage of the combination of pulses, a circuit connected to said storage system for varying the combination of stored pulses in stages whose number depends upon the information represented by the initially stored combination of pulses and for finally deleting the stored pulses from the system, and output producing means connected to the system for producing an output signal after the storage of the combination of pulses and at each stage of variation thereof.

5. A transmitting circuit for the transmission of signals derived from information transmitted to the circuit comprising in combination, a pulse storage system comprising a plurality of pulse storage devices, information receiving means connected to said system for receiving information from a source, information storing means joined to said information receiving means and to said system for storing information in the system as a combination of pulses, control apparatus for said storing means comprising start signal producing means and time delay means for receiving the start signal and applying it after a time delay to said storing means to permit storage of the combination of pulses, a circuit connected to said storage system for transferring pulses of said combination from one storage device of said plurality of storage devices to another device and for finally deleting the stored pulses from the devices, and output producing means connected to the system for producing an output signal after the storage of the combination of pulses and at each transference.

6. A transmitting circuit for the transmission of signals derived from information transmitted to the circuit from sources of information comprising in combination a pulse storage system, information receiving means connected to said system for receiving information from a source and storing the information in the system as a combination of pulses, a circuit connected to said system for varying the combination of stored pulses in stages whose number depends upon the information represented by the initially stored combination of pulses and for finally deleting the stored pulses from the system, output producing means connected to the system for producing an output signal after the storage of the combination and at each stage of variation thereof, a further pulse storage system, means for storing a pulse in said further system when said combination of pulses is stored, storage inhibiting means connected to said information receiving means and an actuating connection from the output of said further pulse storage system to said storage inhibiting means.

7. A transmitting circuit for the transmission of signals derived from information transmitted to the apparatus comprising in combination, a pulse storage system comprising a plurality of pulse storage devices, information receiving means connected to said system for receiving information from a source and storing the information in a first of said pulse storage devices as a combination of pulses stored in time positions in a recurring cycle of time positions characteristic of the information, further information from said source being stored by said information receiving circuit in other pulse storage devices of said pulse storage system as combinations of pulses in time positions characteristic of the information, a circuit connected to said storage system for varying in stages the combination of pulses in said first storage device, output producing means connected to the system for producing an output signal after the storage of the combination of pulses and at each stage of variation thereof, a pulse deletion circuit connected to said first pulse storage device for deleting pulses stored therein, and a pulse transferring circuit between storage devices for transferring the pulses in one device to another device on deletion of the pulses in said other device.

8. A transmission circuit as claimed in claim 7 and further comprising means for providing an actuating pulse for controlling the transmission of output signals derived from the combination of pulses stored in said first storage device.

9. A transmission circuit for the transmission of signals derived from information transmitted to the apparatus comprising in combination, a pulse storage system comprising a plurality of pulse storage devices, information receiving means connected to said system for receiving information from a source and storing the information in a first of said storage devices as a combination of pulses stored in time positions characteristic of the information, a circuit connected to said storage system for varying in stages the combination of pulses in said first storage device by, at each stage, reducing by unity the number characterised by the then stored combination of pulses until zero is reached, output signal producing means connected to the system for producing an output signal after the storage of the combination of pulses in said first device and on each of said reductions, and means for inserting a pulse into a second of said pulse storage devices on each reduction and for deleting the pulse on termination of the output pulse transmitted on the reduction.

References Cited in the file of this patent

UNITED STATES PATENTS

| | | |
|---|---|---|
| 2,723,311 | Malthaner | Nov. 8, 1955 |
| 2,853,694 | Metzger | Sept. 23, 1958 |